(12) United States Patent
Gangadharan et al.

(10) Patent No.: US 9,648,052 B2
(45) Date of Patent: May 9, 2017

(54) REAL-TIME COMMUNICATIONS GATEWAY (71) Applicant: Oracle International Corporation, Redwood Shores, CA (US)

(72) Inventors: Binod Pankajakshy Gangadharan, Bangalore (IN); Yumin Sang, Beijing (CN); Shuquan Zhang, Beijing (CN); Robby Wang, Beijing (CN); Yuwei Li, Beijing (CN); Michael D. Melo, Nutting Lake, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 198 days.

(21) Appl. No.: 14/604,086

(22) Filed: Jan. 23, 2015

(65) Prior Publication Data

US 2016/0219093 A1  Jul. 28, 2016

(51) Int. Cl.
| G06F 15/16 | (2006.01) |
| H04L 29/06 | (2006.01) |
| H04N 21/00 | (2011.01) |
| H04N 21/6437 | (2011.01) |
| H04L 29/08 | (2006.01) |

(52) U.S. Cl.
CPC ...... *H04L 65/1069* (2013.01); *H04L 65/1006* (2013.01); *H04L 69/24* (2013.01); *H04N 21/00* (2013.01); *H04N 21/6437* (2013.01); *H04L 67/303* (2013.01)

(58) Field of Classification Search
CPC . H04L 67/2842; H04L 67/42; H04L 67/1097; G06F 11/1076

USPC .......................................................... 709/215
See application file for complete search history.

(56) References Cited

U.S. PATENT DOCUMENTS

| 8,245,285 | B1* | 8/2012 | Ravishankar | ........... G06F 21/77 |
| | | | | 726/9 |
| 2012/0221559 | A1* | 8/2012 | Kidron | .............. G06F 17/30867 |
| | | | | 707/723 |
| 2012/0303722 | A1* | 11/2012 | Richter | .................. G06Q 50/01 |
| | | | | 709/206 |
| 2013/0318154 | A1* | 11/2013 | Jacobson | ................ H04L 67/10 |
| | | | | 709/203 |
| 2014/0057667 | A1* | 2/2014 | Blankenship | ......... H04L 67/303 |
| | | | | 455/500 |
| 2014/0109041 | A1* | 4/2014 | Yunten | ...................... G06F 8/34 |
| | | | | 717/109 |
| 2014/0222893 | A1 | 8/2014 | Gangadharan et al. | |
| 2014/0222894 | A1 | 8/2014 | Gangadharan et al. | |
| 2014/0222930 | A1 | 8/2014 | Gangadharan et al. | |
| 2014/0222957 | A1 | 8/2014 | Gangadharan et al. | |
| 2014/0222963 | A1 | 8/2014 | Gangadharan et al. | |
| 2014/0379931 | A1* | 12/2014 | Gaviria | ............... H04L 65/1016 |
| | | | | 709/227 |

(Continued)

*Primary Examiner* — Umar Cheema
*Assistant Examiner* — Hannah S Wang
(74) *Attorney, Agent, or Firm* — Miles & Stockbridge P.C.

(57) ABSTRACT

A system performs Real-Time Communications ("RTC"). The system establishes a signaling channel between a browser application and a rich communications services ("RCS") endpoint. The system then queries RCS capabilities of the RCS endpoint via the signaling channel, and initiates the RTC between the browser application and the RCS endpoint via the signaling channel.

20 Claims, 4 Drawing Sheets

(56) References Cited

U.S. PATENT DOCUMENTS

| | | | |
|---|---|---|---|
| 2015/0127709 A1* | 5/2015 | Pai | H04L 65/1006 709/202 |
| 2016/0127199 A1* | 5/2016 | Ding | H04L 41/5051 709/226 |
| 2016/0173464 A1* | 6/2016 | Wang | H04L 61/2589 713/171 |

* cited by examiner

REAL-TIME COMMUNICATIONS GATEWAY

FIELD

One embodiment is directed generally to a communications network, and in particular, to delivering real-time media over a communications network.

BACKGROUND INFORMATION

Voice communications are increasingly shifting to web and Internet based applications that are outside of traditional telephony networks. Enterprise users desire to access their unified communications applications with their own Internet connected mobile devices and consumers increasingly prefer internet based communications channels to access contact centers.

Some communications service providers ("CSPs") and enterprises have deployed real-time communications ("RTC") applications based on a technology known as WebRTC. WebRTC is an open internet standard for embedding real-time multimedia communications capabilities (e.g., voice calling, video chat, peer to peer ("P2P") file sharing, etc.) into a web browser. For any device with a supported web browser, WebRTC can use application programming interfaces ("APIs") to equip the device with RTC capabilities without requiring users to download plug-ins. By using WebRTC, CSPs may create new web based communications services and extend existing services to web based clients.

While WebRTC protocols enable RTC between web browser applications, many mobile devices perform RTC according to a different technology defined by a Rich Communications Services ("RCS") program. RCS is a Global System for Mobile Communications ("GSM") Association ("GSMA") program for the creation of inter-operator communications services based on IP Multimedia Subsystem ("IMS").

SUMMARY

One embodiment is a system that performs Real-Time Communications ("RTC"). The system establishes a signaling channel between a browser application and a rich communications services ("RCS") endpoint. The system then queries RCS capabilities of the RCS endpoint via the signaling channel, and initiates the RTC between the browser application and the RCS endpoint via the signaling channel.

DETAILED DESCRIPTION

Embodiments provide a flexible gateway for Real-Time Communications ("RTC") between a browser operating according to WebRTC and a Rich Communications Services ("RCS") endpoint. Embodiments implement a Message Session Relay Protocol ("MSRP") over WebSocket that is generally hidden from application developers and can interact with an RCS client. Also, enhancements to application programming interface ("API") and signaling are provided to support RCS device capability discovery. Accordingly, embodiments give the developers the possibility of implementing WebRTC and RCS applications quickly using a JavaScript SDK. Further, by using a Groovy script in the signaling engine, web applications can control the flexibility of a WebRTC session controller ("WSC") gateway.

Figure 1:
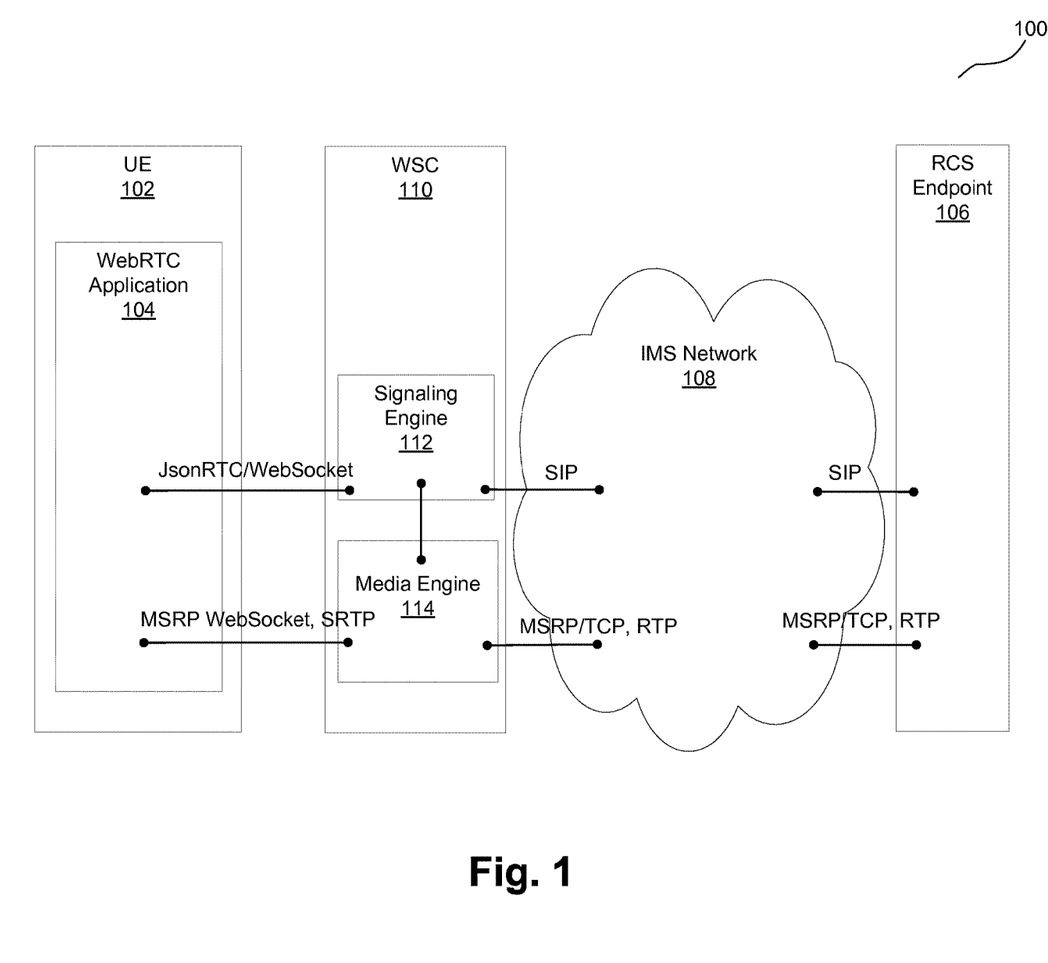
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that executes a WebRTC application 104. WebRTC technology enables Real-Time Communications ("RTC") in the browser as defined in the Internet Engineering Task Force ("IETF") and World Wide Web Consortium ("W3C") standards. RTC refers to a mode of communication in which users exchange information instantly or with negligible latency. Thus, "real-time" can be synonymous with "live." UE 102 may be any device used by an end-user for communications, such as a smartphone, a laptop computer, a tablet, etc.

In one embodiment, WebRTC application 104 performs RTC with an RCS endpoint 106 connected to an Internet Protocol ("IP") Multimedia Subsystem ("IMS") network 108. RCS is a Global System for Mobile Communications ("GSM") Association ("GSMA") program for the creation of inter-operator communications services based on IMS. IMS is an architectural framework for delivering IP multimedia services. RCS defines a set of communications services which, apart from voice and video communications, include 1-1 and 1-Many chats, file transfer, etc. RCS clients are usually present in mobile devices. RCS endpoint 106 may be any mobile phone equipped with RCS capability.

Network 100 further includes a WSC 110 that is a gateway that connects a web application with another communications network. A gateway translates a protocol to another protocol. In FIG. 1, WSC 110 connects WebRTC application 104 to IMS network 108. WSC 110 provides interoperability for web-to-web and web-to-network RTC. WSC 110 includes a signaling engine 112 and a media engine 114 that bridge WebRTC application 104 to existing networks such as IMS network 108. In FIG. 1, signaling engine 112 bridges WebRTC signaling to Session Initiation Protocol ("SIP") signaling, and media engine 114 bridges WebRTC media to existing Voice over IP ("VoIP") system media. SIP is a signaling communications protocol, conventionally used for controlling multimedia communications sessions such as voice and video calls over IP networks.

Figure 2:
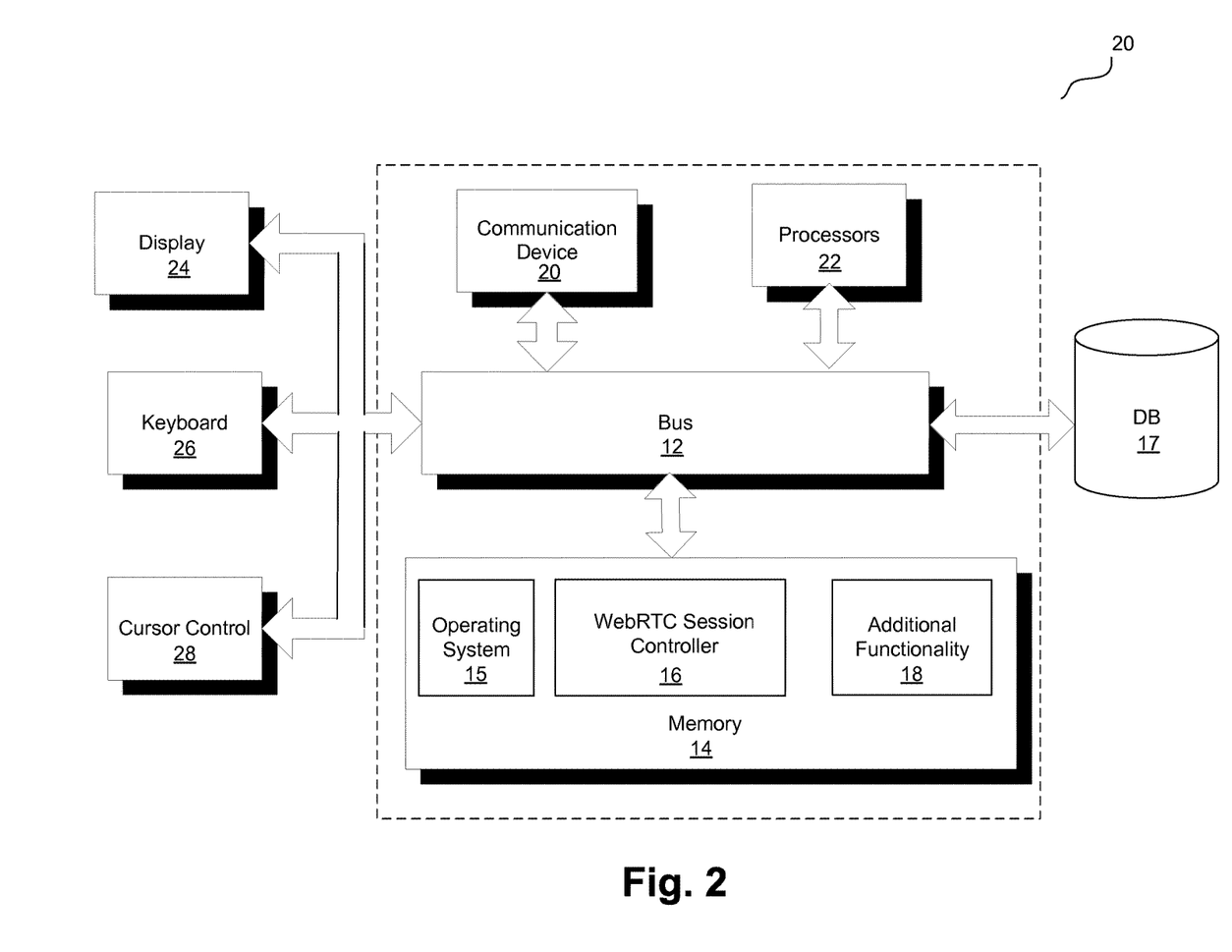
FIG. 2 is a block diagram of a computer server/system in accordance with an embodiment of the present invention.

FIG. 2 is a block diagram of a computer server/system 10 in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a session controller, system 10 may be a server that in general has no need for a display 24 or one or more other components shown in FIG. 2.

System 10 includes a bus 12 or other communications mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communications device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communications media. Communications media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include WSC module 16 for providing RTC, and all other functionality disclosed herein. System 10 can be part of a larger system, such as added functionality to the "Oracle Communications WebRTC Session Controller" from Oracle Corp. Therefore, system 10 can include one or more additional functional modules 18 to include the additional functionality. A database 17 is coupled to bus 12 to provide centralized storage for modules 16 and 18.

Referring again to FIG. 1, with known systems, WebRTC technology enables RTC in a Web browser as defined in IETF and W3C standards. However, many users perform RTC according to the protocols defined by an RCS program. Since WebRTC merely enables real-time media and data transfer, there are technical challenges for a WebRTC application that needs to communicate with an RCS endpoint. Further, in order to be RCS compliant, an application needs to discover the capabilities of the endpoint it is communicating with. RCS capability discovery includes determining which device supports what services.

One known solution to provide RTC between a WebRTC application and an RCS compliant device is to support MSRP over web friendly protocols such as "WebSocket" and "data channel." MSRP is a protocol for transmitting a series of related instant messages in the context of a communications session. An application instantiates the session with the Session Description Protocol ("SDP") over SIP or other rendezvous methods. SDP is a format for describing streaming media initialization parameters. A rendezvous protocol is a computer network protocol that enables resources or peer to peer ("P2P") network peers to find each other. A socket is a bidirectional communications endpoint for sending/receiving data to/from another socket. It is the fundamental technology for programming software to communicate on a TCP/IP network. A WebSocket is a protocol providing full duplex communications channel over a single transmission control protocol ("TCP") connection.

One disadvantage with this known approach is that it does not encapsulate an application developer from the complexities associated with interoperating with RCS endpoints, and applications may need to work on low level protocol abstractions.

In contrast to the known solutions, one embodiment of the present invention provides an MSRP over WebSocket implementation that is generally hidden from the application developers and can interact with an RCS client. Embodiments also provide API and signaling enhancements to support RCS device capability discovery.

Referring again to FIG. 1, in one embodiment, WebRTC application 104 establishes a signaling channel with WSC signaling engine 112 over a JavaScript Object Notation ("JSON") protocol for RTC ("JsonRTC"). JSON (JavaScript Object Notation) is a lightweight data-interchange format. JsonRTC establishes the sessions (i.e., persistent communications sessions) and subsessions (i.e., logical session activities within a session, such as a call or a file transfer) used to pass messages between WSC 110 and its client applications inside WebSocket connections. WebRTC application 104 uses this signaling channel for querying RCS endpoint 106 for discovering its capabilities. Accordingly, this capability discovery is an extension over the JsonRTC protocol which is translated by WSC signaling engine 110 to SIP. In one embodiment, WebRTC application 104 uses a JavaScript software development kit ("SDK") for capability discovery.

Once the capability discovery is complete, WebRTC application 104 utilizes the SDK again to use the signaling channel for initiating RTC with RCS endpoint 106. During RTC, media engine 114 in WSC 110 creates a WebSocket listener for Message Session Relay Protocol ("MSRP") communications by looking at the SDP that is transferred. MSRP is a protocol for transmitting a series of related instant messages in the context of a communications session. An application instantiates the session with the Session Description Protocol ("SDP") over SIP or other similar methods. SDP is a format for describing streaming media initialization parameters. The complete uniform resource identifier ("URI") of the created WebSocket listener includes an ephemeral port and a unique context root. A URI is a string of characters used to identify a name of a resource. An ephemeral port is a short-lived transport protocol port for IP communications allocated automatically from a pre-defined range. A context root determines the uniform resource locator ("URL") of a deployed application. A URL is a specific character string that constitutes a reference to a resource. The complete URI of the WebSocket listener (i.e., including the ephemeral port and the unique context root) is communicated to the JavaScript SDK in the client (i.e., WebRTC application 104) using the signaling channel.

The JavaScript SDK is then ready for performing RTC with RCS endpoint 106 (e.g., chat, file transfer, audio/video communications, etc.). In one embodiment, WebRTC application 104 uses APIs in the JavaScript SDK to send messages/files or start an audio/video communications that is compliant with RCS.

In one embodiment, WSC 110 supports APIs and call flows that match RCS requirements and call flows. Such APIs and call flows include capability exchange, standalone messaging, 1-1 chat, group chat, file transfer, image/video sharing, etc. These APIs and call flows may not include any RCS specific feature tags or message payloads. Accordingly, an RCS compliant user agent is readily implemented by extending/using Groovy scripts and JavaScript APIs. Groovy is a dynamic language that can be used as a scripting language for the Java Platform, is dynamically compiled to Java Virtual Machine ("NM") bytecode, and interoperates with other Java code and libraries. Further, embodiments are aligned with Joyn device API functionality where possible. "Joyn" refers to the Rich Communications Services program that is a Global System for Mobile communications ("GSM") Association ("GSMA") program for creation of inter-operator communications services based on IMS.

Capability Exchange

Figure 3:
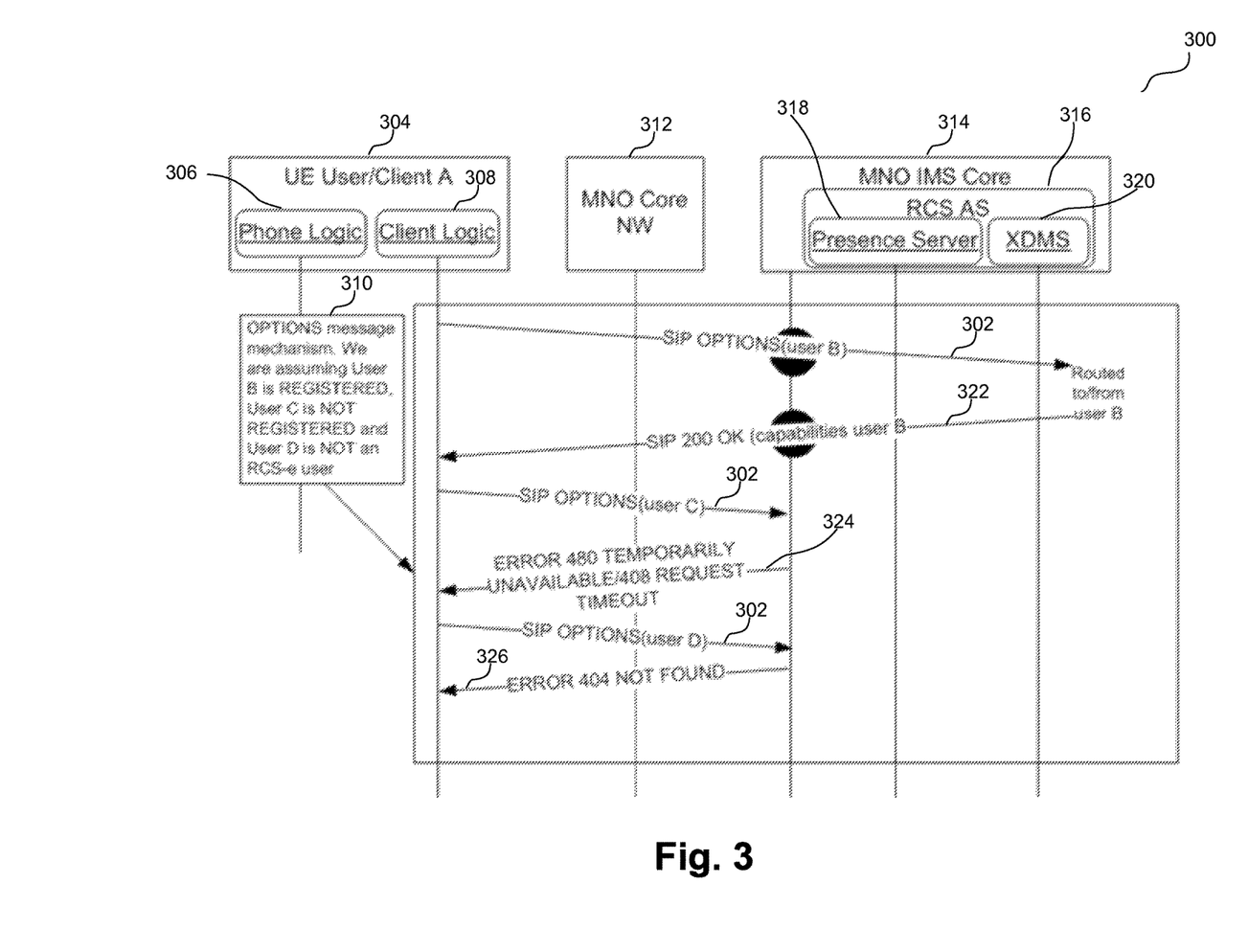
FIG. 3 is an example call flow for device capability exchange in accordance with an embodiment of the present invention.

In one embodiment, RCS capability exchange can be implemented by a capability discovery process through a message (e.g., an "OPTIONS" message), or by capability discovery via presence. FIG. 3 illustrates an example call flow 300 for device capability exchange via "SIP OPTIONS" message 302 in accordance with one embodiment. User A 304 initiates the capability discovery by sending "SIP OPTIONS" message 302 intended for users B, C, or D (not shown). User A 304 implements phone logic 306 and client logic 308. Phone logic 306 specifies an options message mechanism 310 to interpret the response received after sending "SIP OPTIONS" message 302 and determine the RCS capabilities of a user. In the example of FIG. 3, User B is "REGISTERED," user C is "NOT REGISTERED," and user D is "NOT an RCS-e user" (i.e., user D is not RCS enhanced). "SIP OPTIONS" message 302 is transmitted over a mobile network operators ("MNO") core network 312 and through an MNO IMS core 314. MNO IMS core 314 includes an RCS application server ("AS") 316, which in turn includes a presence server 318 and an Extensible Markup Language ("XML") document management server ("XDMS") 320. RCS AS 316 is a server that handles RCS server side requirements in a SIP network. Presence Server 318 is a server in the network which manages the presence status (e.g., online, busy, offline, etc.) of each user. XDMS 320 is a server used by the network for keeping information such as buddy list (i.e., friends list), white list, black list, etc.

During RCS capability discovery, client logic 308 handles the transmission of "SIP OPTIONS" message 302 and the reception of corresponding responses at user A 304. For user B that is "REGISTERED," client logic 308 receives a "SIP 200 OK" response 322 including capabilities of user B. For user C that is "NOT REGISTERED," client logic 308 receives an "ERROR 480 TEMPORARILY UNAVAILABLE/408 REQUEST TIMEOUT" message 324. For user D that is "NOT an RCS-e user," client logic 308 receives an "ERROR 404 NOT FOUND" message 326. Accordingly, based on the response received for "SIP OPTIONS" message 302, RCS capabilities of a client may be determined.

In one embodiment, a "capability" package is added to Json-RTC protocol to send capability queries between WSC clients. Further, an "enquiry" action is added that represents the message for querying capabilities. An action is an object used to separate functionality and state from a component. For example, if there are two or more components that perform the same function, an action object can be used to implement the function. Further, an "enquiry_data" general header is provided to send header information specific to enquiry. A header indicates what value types, if any, a method will return. Capability exchange may also happen within an existing subsession that is part of another package (e.g., a call). In that case, the action and general header are reused for the same purpose.

In one embodiment, "enquiry" action uses control types "request" and "response". The following functionality provides example JSON messages for capability enquiry request and response in accordance with one embodiment.

```
{
    "control": {
        "package_type": "capability",
        "type":"request",
        "sequence":"2",
    },
    "header": {
        "action":"enquiry",
        "enquiry_data": "IM/CHAT,VS"
        "initator":"bob@att.com",
        "target":"alice@att.com",
    }
}
{
    "control": {
        "package_type": "capability",
        "type":"response",
        "sequence":"2",
    },
    "header": {
        "action":"enquiry",
        "enquiry_data": "IM/CHAT"
        "initator":"bob@att.com",
        "target":"alice@att.com",
    }
}
```

In one embodiment, a JavaScript class "CapabilityExchange" is created using a constructor "CapabilityPackage (session, packageType)" (with a default packageType "capability"), or with a call to a method "createCapabilityExchange" that creates a fresh "CapabilityExchange" instance. In object-oriented programming ("OOP"), a class is an extensible program code template for creating objects, providing initial values for state (member variables) and implementations of behavior (member functions, methods). A method is a subroutine associated with an object of a class that forms its interface through which the outside members of the class (i.e., other objects) can access its private members (e.g., the encapsulated data). A constructor in a class is a subroutine called to create an object.

In one embodiment, constructor "CapabilityExchange (subSession)" creates a "CapabilityExchange" with a "subSession" object instance as parameter. Table 1 shows the methods used for capability discovery and Table 2 provides properties for "type Definition: Query" in accordance with one embodiment.

TABLE 1

Capability discovery methods

| Method | Description |
| --- | --- |
| enquiry(selfCapability, target) | Query the capability of peer side, also carry self capability in query request. |
| respond(Query, selfCapability) | Response peer's capability query with self capability, self capability may be empty, e.g. query from blacklist. |
| onQueryRequest(Query) | callback function for incoming capability query request. |
| onQueryResponse(Query) | callback function for capability query response. |
| onError(Error) | callback function for error response such as unreachable or time out. |

TABLE 2

Properties for "type Definition: Query"

| Properties | Type | Description |
| --- | --- | --- |
| ssid | String | the subSession id, it is generated by SDK. |
| initiator | String | the initiator of the capability enquiry. |
| target | String | the capability enquiry target. |
| initiatorCapability | String | the capability description of the enquiry initiator. |
| targetCapability | String | the capability description of the enquiry target. |

The following example functionality provides an example capability exchange in accordance with one embodiment.

```
//Create fresh
var capabilityPackage = new wsc.CapabilityPackage(wscSession);
var capabilityExchange = capabilityPackage.createCapabilityExchange( );
//Create inside a call
var capabilityExchange = new CapabilityExchange(call);
    //Interface to send a capability query message
    capabilityExchange.enquiry("File transfer", "bob1@example.com");
    //Interface to listen for the query response
    capabilityExchange.onQueryResponse = function (Query){
        console.log("There is a capability query response
        from: "+Query.target);
    };
    //Interface to listen for the query request
    capabilityExchange.onQueryRequest = function (Query){
        console.log("There is a capability query from: "+Query.initiator);
        var selfCapability= "Image share";
        self.respond(Query, selfCapability);
    };
    capabilityExchange.onError = function(err){
        console.log("Error action: "+err.action);
        console.log("Error code: "+err.errorCode);
        console.log("Error reason: "+err.errorReason);
}
```

In one embodiment, Groovy scripts (i.e., pseudo codes) are added to handle capability discovery criteria based on the package (e.g., capability or call), action (e.g., enquiry), and SIP method (e.g., "OPTIONS"). The following functionality provides an example Groovy script configured in a "call" package or a new "capability" package to support capability discovery on the server side in accordance with one embodiment.

```
FROM_APP/request/enquiry
    def sipRequest = context.sipFactory.createSipRequest("OPTIONS")
    def tags =
    mapToSipTags(context.webMessage.header.enquiry_data) //
    TODO, this is mock method. mapping
    sipRquest.addHeader("Accept-contact", tags)
    sipRequest.setSipContactParameter(tags, null)
    sipRequest.send( )
FROM_NET/response/OPTIONS
    def sipRequest = context.originatingSipMessage
    def webMessage =
    context.webFactory.createWebResponse("enquiry")
    webMessage.header = [
        initiator : sipAddressToString(sipRequest.from),
        target : sipAddressToString(sipRequest.to)
    ]
    //parse "contact" tags and mapping them to Web "enquriy_data"
    webMessage.header.enquiry_data = <capabilities data>
    webMessage.send( )
```

One embodiment determines the "package" type for an incoming "SIP OPTIONS" in an initial request. For example, in "Script Library," embodiments add logic in "resolvePackageType" method to resolve "OPTIONS" request according to certain headers. In the following example functionality the user checks for specific headers in accordance with one embodiment.

```
String resolvePackageType(final WscSipRequest sipRequest) {
    ...
    if ("OPTIONS".equalsIgnoreCase(sipRequest.method) &&
    sipRequest.getHeader("Accept-Contact").contains("+
        packageType = "capability"
    }
    ...
}
```

Standalone Messages

In one embodiment, WSC uses "Pager Mode" to implement sending standalone messages, while on the network side "SIP MESSAGE" request is used. A "messaging" package is defined and used on its own subsession, and a "send" action is defined for sending messages using control type "message." The following functionality provides an example JSON message for "messaging" package in accordance with one embodiment.

```
{
    "control": {
        "package_type": "messaging",
        "type":"request",
        "sequence":"2",
    },
    "header": {
        "action":"send",
        "initator":"bob@att.com",
        "target":"alice@att.com",
    },
    "payload": {
        "content": "<message data>"
    }
}
```

In one embodiment, an API is used to send the standalone message. The content of the message is provided by the application, and WSC does not modify or understand the message content. A JavaScript class "messaging" is created using constructor "MessagingPackage(session, packageType)" for which the default packageType is "messaging." Method "createMessaging" is also used to create a messaging instance. Table 3 provides methods of class "messaging" and Table 4 provides properties for "Type Definition: MessagingMessage" in accordance with one embodiment.

TABLE 3

"Messaging" methods

| Method | Description |
| --- | --- |
| send(textMsg, target) | Send text message to target, return the msgId of the sent message. |
| accept(message) | Accept the message, the message is type of MessagingMessage |
| reject(message, code, reason) | Reject the incoming message, the message is type of MessagingMessage |
| getMessage(msgId) | Get the pending message from wsc Session by given msgId, the msgId is returned by invoke the send method |

TABLE 3-continued

"Messaging" methods

| Method | Description |
|---|---|
| onNewMessage(message) | Callback function for new message, the message is type of MessagingMessage |
| onSuccessResponse(message) | Callback function for sending message success response, the message is type of MessagingMessage |
| onErrorResponse(message, code, reason) | Callback function for sending message error response, the message is type of MessagingMessage |

TABLE 4

Properties for "Type Definition: MessagingMessage"

| Properties | Type | Description |
|---|---|---|
| msgId | String | the message id that is genereated by SDK |
| initiator | String | the sender of the message |
| target | String | the receiver of the message |
| content | String | the text message content |

The following example functionality sends a stanalone message in accordance with one embodiment.

```
// Create Messaging package
messagingPackage = new wsc.MessagingPackage(wscSession);
var messaging = MessagingPackage.createMessaging( );
// Messaging interfaces
messaging.send(textMsg, target);
messaging.onNewMessage = onNewMessage;
function onNewMessage(msg) {
    var
        initiator = msg.initiator,
        content = msg.content;
        messaging.accept(msg);
}
```

In one embodiment, Groovy scripts (i.e., pseudo codes) are added to handle messaging criteria based on the package "messaging", action (e.g., send), and SIP method (e.g., "MESSAGE"). In order to support sending a standalone message on the server side, the following example Groovy scripts may be configured for a new "messaging" package in accordance with one embodiment.

```
FROM_APP/message/send
    def sipRequest = context.sipFactory.createSipRequest("MESSAGE",
    getFromAddress(context), getToAddress
    if (context.webMessage?.payload?.content) {
        sipRequest.setContent(context.webMessage.payload.content,
        "text/plain")
    }
    sipRequest.send( )
FROM_NET/request/MESSAGE
    def sipRequest = context.originatingSipMessage
    def webMessage = context.webFactory.createWebMessage("send")
    webMessage.header = [
        initiator : sipAddressToString(sipRequest.from),
        target : sipAddressToString(sipRequest.to)
    ]
    webMessage.payload = ["content" : sipRequest.content.toString( )]
    context.sipFactory.createSipResponse(200).send( )
    webMessage.send( )
```

Chat (1-1 or Group)

One embodiment provides chat functionality that represents a "session-mode" messaging (i.e., a conversational exchange of messages with a definite beginning and end). For browser to RCS client communications, the SDK uses MSRP and SIP SDP to perform a negotiation with a target and setup a WebSocket connection with media engine 114. The SDK then chunks data according to the MSRP specification and passes them through the WebSocket to media engine 114. Accordingly, chunking is performed within the client and media engine 114 does not need to re-chunk data. For group chat, a "participant list" is added to the message by using corresponding APIs. Group chat is created by a server in the network by taking the participant list and creating a mixer. For browser to browser chat, MSRP is not necessary and a Web application can use a "CallPackage" data channel function. The Web application can first use the capability exchange function to query target capability and then choose the appropriate way to implement a chat.

MSRP Over WebSocket

In order to provide MSRP over WebSocket, in accordance with one embodiment, constructor "ChatPackage (session, packageType)" is used for which the default packageType is "chat." Tables 5 and 6 show example methods used for providing MSRP over WebSocket and example methods used for "chat," respectively, in accordance with one embodiment. Tables 7 and 8 show example properties for "type Definition: ChatConfig" and "type Definition: ChatMessage," respectively, in accordance with one embodiment.

TABLE 5

Methods used for MSRP over WebSocket

| Method | |
|---|---|
| createChat(target) | Create a 1-1 or Group Chat. |
| prepareChat(session, callee) | used to create a extended Chat object. |
| onIncomingChat(chat) | callback function for incoming chat request. |
| close( ) | Terminate all the Chat sessions and release the resources |
| getChats( ) | Get all the chat sessions. |
| onMessage(msg) | callback function for the JSON message to the ChatPackage. |

TABLE 6

Methods used for "chat"

| Method | Description |
|---|---|
| start(chatConfig, extHeader) | start the chat. |
| addParticipants( ) | Add participants into the chat. By doing this, the SDK will add a participants header to the JSON protocol. |
| send(message) | Send message, return the msgId. |
| accept(chatConfig, extHeaders) | Accept the chat request. |
| end( ) | End the chat session. |
| decline(code, reason, extHeaders) | Decline the chat request with the reason code. |
| setSecure(isSecure) | Set the transport layer to be secure or not. |
| getInitiator( ) | Gets the initiator of the Chat. |
| getTarget( ) | Gets the target of the Chat. |
| onChatMessage(chatMessage) | callback function for incoming chat message. |

TABLE 6-continued

Methods used for "chat"

| Method | Description |
| --- | --- |
| onMessageSendSuccess(msgId) | callback function for message send success. |
| onMessageSendFailure(msgId, status, reason) | callback function for message send failure. |
| onStateChange( ) | callback function for chat signalling state change. |
| onConnectionStateChange( ) | callback function for the chat connection state changes. |
| onMessageTyping( ) | Callback function that indicates the other side is typing message.. |
| onMessageTypingStop( ) | Callback function that indicates the other side stopped typing message.. |
| onMessage(msg) | callback function for the JSON message to the Chat. |

TABLE 7

Properties for "type Definition: ChatConfig"

| Properties | Type | Description |
| --- | --- | --- |
| acceptTypes | Array | The "accept-types" attribute contains a list of media types that the endpoint is willing to receive. It may contain zero or more registered media-types, or " " |
| acceptWrappedTypes | Array | The "accept-wrapped-types" attribute contains a list of media types that the endpoint is willing to receive in an MSRP message with multipart content, but may not be used as the outermost type of the message. It may contain zero or more registered media-types, or " " |
| maxSize | Number | The "max-size" attribute indicates the largest message an endpoint wishes to accept. It may take any whole numeric value, specified in octets. |

TABLE 8

Properties for "type Definition: ChatMessage"

| Properties | Type | Description |
| --- | --- | --- |
| contentType | String | The type of the chat message. |
| content | String | The content of the chat message. |

The following example functionality provides a chat in accordance with one embodiment.

```
var chatPackage = new wsc.ChatPackage(mSession);
chatPackage.onIncomingChat = onIncomingChat;
var wscChat = chatPackage.createChat(callee);
wscChat.onSessionStateChange = onChatSessionStateChange;
wscChat.onChatMessage = onChatMessage;
wscChat.onMessageSendSuccess = onMessageSendSuccess;
wscChat.onMessageSendFailure = onMessageSendFailure;
wscChat.onMessageTyping = onMessageTyping;
wscChat.onMessageTypingStop = onMessageTypingStop;
var chatConfig = {...};
wscChat.start(chatConfig);
```

Image/File Transfer

One embodiment provides functionality for image or file transfer as an MSRP file transfer. As described herein with reference to a session mode chat, embodiments provide APIs for communications between a browser application and an RCS client. Browser to browser communications can use the data channel. A "FileTransferPackage (session, packageType)" constructor is provided with a default packageType of "fileTransfer." Tables 9 and 10 provide example methods for "FileTransferPackage" and "FileTransfer," respectively, in accordance with one embodiment.

TABLE 9

"FileTransferPackage" methods

| Method | |
| --- | --- |
| createFileTransfer(target) | Create a 1-1 or 1-N file transfer. |
| prepareFileTransfer( ) | used to create a extended File Transfer object. |
| onFileTransfer(fileTransfer) | callback function for transfer files request. |
| close( ) | Terminate all the FileTransfer sessions and release all resources |
| getFileTransfers( ) | Get all the FileTransfer sessions. |
| onMessage(msg) | callback function for the JSON message to the FileTransferPackage. |

TABLE 10

"FileTransfer" methods

| Method | Description |
| --- | --- |
| start(fileConfig, extHeaders) | Start file transfer with single file, the default operation is push file to target, if set fileConfig.props.direction to 'receive', the operation is pull file from target. After invoke this method, the SDK will set the 'fileTransferId' to the fileConfig object. |
| start(fileConfigs, extHeaders) | Not Supported yet. Start file transfer with multiple files, the default operation is push file to target, if set fileConfig.props.direction to 'receive', the operation is pull file from target. After invoke this method, the SDK will set the 'fileTransferId' to each fileConfig object. |
| addParticipants( ) | Add participants into the fileTransfer. By doing this, the SDK will add a participants header to the JSON protocol. |
| accept(fileConfigs, extHeaders) | Accept the chat request. |
| decline(code, reason, extHeaders) | Decline the chat request. |
| abort( ) | Aborts the ongoing file transfer |
| setSecure(isSecure) | Set the transport layer to be secure or not. |
| getInitiator( ) | Gets the initiater of the FileTransfer. |
| getTarget( ) | Gets the target of the FileTransfer. |
| onFileData(fileData) | callback function for file data. |
| onProgress(fileProgressData) | callback function send file progress. |
| onStateChange( ) | callback function for file transfer signalling state change. |
| onConnectionStateChange( ) | callback function for file transfer connection state changes. |
| onFileTransferSuccess(fileTransferId) | callpack function for file transfer success. |
| onFiieTransferFailure(fileTransferId, status, reason) | callback function for file transfer failure. |
| onMessage(msg) | callback function for the JSON message to the FileTransfer. |

Tables 11, 12, 13, 14, and 15 provide example properties for "Type Definition: FileConfig" "Type Definition: FileProperty," "Type Definition: FileData," "Type Definition: File- DataRange," and "Type Definition: FileProgressData," respectively, in accordance with one embodiment.

TABLE 11

Properties for "type Definition: FileConfig"

| Properties | Type | Description |
| --- | --- | --- |
| file | window.File | The js File instance |
| props | FileProperty | The file properties. |

TABLE 12

Properties for "type Definition: FileProperty"

| Properties | Type | Description |
| --- | --- | --- |
| name | String | The file name |
| size | Number | The file size in octets. |
| type | String | The MIME type of the file. |
| hashes | Array | Hash computation of the file, it includes a set of hash algorithm and its value that in format: {algorithmName : ", value : "} |
| dispositon | String | t is the suggestion to peer point how to handle the file. there are 2 options: 'render' indicates that a file should be automatically rendered; 'attachment' indicate to the file receiver that the file should not be rendered at the reception of the file. the default value is 'render'. |
| description | String | The description of the file. |
| creationTime | String | The file creation time |
| modificationTime | String | The file modification time. |
| readTime | String | The file read time. |
| icon | String | cid-url for icon of the file (for image files in general). |
| startOffset | String | Start offset of file range, refers to the octet position of the file where the file transfer should start. The first octet of a file is denoted by the ordinal number "1". |
| stopOffset | String | Stop offset of file range, refers to the octet position of the file where the file transfer should stop, inclusive of this octet. The "stop offset" value MAY contain a " " if the total size of the file is not known in advance. |
| direction | String | Direction of the file transfer. There are two options: 'send' if to push file, and 'receive' if to pull the file. |

TABLE 13

Properties for "type Definition: FileData"

| Properties | Type | Description |
| --- | --- | --- |
| fileTransferId | String | The file transfer id. |
| range | FileDataRange | The range of the data in the total file. |
| content | UInt8Array | The content. |

TABLE 14

Properties for "type Definition: FileDataRange"

| Properties | Type | Description |
| --- | --- | --- |
| start | Number | The start byte of the data. |
| end | Number | The end byte of the data. |
| total | Number | The total file data byte number. |

TABLE 15

Properties for "type Definition: FileProgressData"

| Properties | Type | Description |
| --- | --- | --- |
| fileTransferId | String | The file transfer id. |
| range | FileDataRange | The range of the data in the total file. |

The following example functionality provides a file transfer in accordance with one embodiment.

```
var fileTransferPackage = new wsc.FileTransferPackage(mSession);
fileTransferPackage.onFileTransfer = onFileTransfer;
var wscFileTransfer = fileTransferPackage.createFileTransfer(callee);
wscFileTransfer.onCallStateChange = onCallStateChange
wscFileTransfer.onSessionStateChange = onSessionStateChange
wscFileTransfer.onFileData = onFileData;
wscFileTransfer.onProgress = onFileProgress;
wscFileTransfer.onFileTransferSuccess = onFileTransferSuccess;
wscFileTransfer.onFileTransferFailure = onFileTransferFailure;
var fileConfigs = [...];
wscFileTransfer.start(fileConfigs);
```

Video Transfer

One embodiment uses a SDK for providing video transfer through RTP by adding another stream to an existing call.

MSRP-over-WebSocket Interface

One embodiment provides an interface between WSC media engine 114 and a browser JavaScript delivered by signaling engine 112. The interface allows WebRTC browsers and RCS clients using MSRP to chat and transfer files. In this WebSocket connection model, the WebRTC browser initiates the WebSocket connection. In one example embodiment, media engine 114 supports both WebSocket and WebSocket secure ("WSS") connections from the browser, but only MSRP/WSS are used in WSC deployments.

In one embodiment, WSC media engine 114 does not have any static listening ports for MSRP, and MSRP listeners are created during MSRP session setup. Media engine 114 determines an appropriate local interface to use to reach the remote MSRP client and requests allocation of a media port for the MSRP connection from the media port pool of media engine 114. When media engine 114 is the passive end of the connection (WS/WSS and inbound MSRP), the listener is activated and transport information for this local listener is returned in the SDP that is modified by media engine 114. When media engine 114 is the active end of the connection (outbound MSRP), media engine 114 initiates the connection from the allocated media port and transport information is again returned in the SDP that is modified by media engine 114.

In one embodiment, for authentication of the browser by media engine 114, the WebRTC MSRP client creates a direct WSS connection between the browser and media engine 114. Creation of transport layer security ("TLS") connection between browser and media engine 114 involves the following functionality. Media engine 114 is provisioned with a certificate issued by a browser-preloaded trusted root certification authority ("CA"). In cryptography, a public key certificate (also known as a digital certificate or an identity certificate) is an electronic document used to prove ownership of a public key. A CA is an entity that issues digital certificates. A root CA certificate may be the base to issue multiple intermediate CA certificates with varying validation requirements. The media engine MSRP inLeg and outLeg configurations reference corresponding certificates. The media engine certificate common name ("CN") must match the fully qualified domain name ("FQDN") used by the browser to initiate the WSS connection. This also applies for MSRP and TLS. FDQN (also called absolute domain name) is a domain name that specifies an exact location in the tree hierarchy of the Domain Name System ("DNS"). DNS is a hierarchical distributed naming system for computers, services, or resource in a network. WSC deployment provides the ability for browsers to DNS-resolve the media engine FQDN, even when media engine clusters are present, and the DNS resolver may be independent of WSC.

In one embodiment, once a TLS connection is established, the browser can contact media engine 114 using the path component of a WSS resource name supplied via a SDP attribute "a=ws-resource-path". This resource name path component is dynamically generated by media engine 114 and is ephemeral and unique. Media engine 114 allows an inbound WSS connection via this path component for a short interval after its creation. The interval is configurable on media engine 114. The combination of SDP integrity protection and the short lived unique WSS resource name allows media engine 114 to determine that the browser is authentic.

In one embodiment, and as described later herein with reference to support in SDP, in order to provide the WSS resource name, media engine 114 adds a "ws-resource-path" attribute to the anchored SDP returned to signaling engine according to "wss-URI="wss:" "//" host [":" port] path ["?" query]," as in RFC6455 standard, section 3. "Host" is the media engine FQDN as supplied in the certificate passed to the browser during TLS establishment, "path" is the value supplied by the "ws-resource-path" SDP attribute, and the query component is empty. The WebSocket connection remains open via "WebSocket keepalives" as in RFC6455 5.5.2/5.5.3.

One embodiment provides WebSocket subprotocols. The WebSockets client adds a "Sec-WebSocket-Protocol" header indicating "msrp" to the "HTTP GET" request initiating the WebSockets connection. The WebSockets server includes an identical header in the corresponding HTTP responses.

One embodiment provides MSRP over WebSockets on both call legs. A MSRP interworking call has one MSRP over WebSocket media connection when WebRTC datachannel is used for WebRTC calls. When media engine 114 encounters a call with multiple MSRP over WebSocket media connections, the media must remain anchored since the WebRTC endpoints have no WebSocket server capability.

One embodiment provides support in SDP for MSRP over WebSockets via two additions to SDP. A "ws" transport parameter appears in the URI in the SDP "path" attribute when MSRP is transported over WebSockets. A "wss" transport parameter appears in the URI when MSRP is transported over secure WebSockets. Media engine 114 interprets all SDP MSRP m-lines with path attributes containing a "ws" (or "wss") transport as having originated from an endpoint that supports MSRP over WebSockets. Similarly, media engine 114 generates path attributes containing a "ws" or "wss" transport for all SDP MSRP m lines being forwarded to an endpoint supporting MSRP over WebSockets, as indicated by the associated session-config delivered to media engine 114. Media engine "in-msrp-session-leg" and "out-msrp-session-leg" configuration properties have "leg-transport" set to WS, WSS, TCP, or TLS as appropriate. Media engine 114 inspects the received SDP offer "m=message" path attribute and insures the MSRP URI transport parameter matches "leg-transport" in the "in-msrp-session-leg" configuration property. When forwarding the SDP offer (SDP being anchored), the path attribute MSRP URI transport parameter is set based on "out-msrp-session-leg" configuration property. Similar functionality is used when processing the received SDP answer and forwarding the SDP answer (SDP being anchored).

In one embodiment, media engine 114 supplies the WebSockets resource path via a SDP "ws-resource-path" attribute. The "ws-resource-path" is required for the WebSockets client to subsequently send a correct "HTTP GET" request to media engine 114. For an MSRP media stream, when anchoring MSRP, media engine 114 modifies the following attributes:
   m-line to indicate transport information as appropriate
   c-line to indicate the anchor address
   path attribute to indicate the scheme/authority/transport as appropriate
   setup attribute to indicate role of media engine 114 (i.e., active or passive) Other MSRP media stream attributes remain unchanged. Issue and interpretation of accept-types, accept-wrapped-types, etc., are handled by MSRP endpoints.

One embodiment performs MSRP traffic forwarding. Media engine 114 adjusts only "To-Path" and "From-Path" headers to indicate that it is anchoring the traffic. Other MSRP headers remain unchanged. MSRP message bodies carrying chunked traffic are forwarded exactly as received. "Success" and "Failure" reports are generated by the MSRP endpoints, except if transport failure is encountered during media engine MSRP traffic forwarding.

One embodiment provides listener creation for MSRP over WebSockets. Media engine 114 creates a WS/WSS listener socket if session-config for the leg indicates WS/WSS transport. This WS/WSS listener is active before media engine anchored SDP (offer or answer) containing the listener address and port is returned to signaling engine. The WS client should use the IP and port in the media engine anchored offer/answer SDP (i.e., the path attribute) to initiate a WS connection to media engine 114. In addition to the WS/WSS listener information, the returned SDP includes a ws-resource-path attribute. This resource path is used by the WS client when issuing an HTTP GET to request the WS connection. The WS/WSS listener is valid for the configured number of seconds, and failure to create a connection in that time causes media engine 114 to reclaim WS/WSS listener resources.

One embodiment provides connection termination for MSRP over WebSockets. Media engine 114 terminates a connection to the WebRTC browser if either the connection to the RCS client terminates or signaling engine sends a CallTerminate event to media engine 114.

The MSRP session manager provides a synchronous API for creation of sessions and session legs. Other session operations including connection control, receiving traffic, forwarding traffic, updating session leg state, and deleting session legs and sessions are asynchronous. This allows the session manager to queue multiple events on a particular MSRP session, support multiple sessions on a connection, and guarantee that the processing of those events is correctly serialized.

The MSRP mstream support runs as part of SDP processing. It activates when one or more "m=message" media-lines with MSRP indicated by protocol are seen in the received SDP. The following are example typical SDP offers for MSRP based instant messaging ("IM") and file transfer in accordance with one embodiment.

```
IM:
m=message 49477 TCP/MSRP * c=IN IP4 10.138.237.214
a=path:msrp://10.138.237.214:49477/4299961;tcp a=connection:new
a=setup:actpass
a=accept-types:text/plain message/CPIM a=accept-wrapped-types:text/
plain image/jpeg image/gif image/bmp image/png a=sendrecv
File Transfer:
m=message 8935 TCP/MSRP * c=IN IP4 10.138.238.49
a=path:msrp://10.138.238.49:8935/25106179;tcp a=connection:new
a=setup:actpass
a=accept-types:message/CPIM application/octet-stream a=accept-wrapped-
types:application/octet-stream image/jpeg image/gif image/bmp image/png
a=sendonly
a=file-selector:name:"log4net.dll" type:application/octet-stream
size:270336 a=file-transfer-id:25102438 a=file-disposition:attachment
a=file-icon:cid:test@msrp.org
```

One embodiment provides functionality for mstream-integration as described in IETF RFC4975 Section 8 and RFC5547 regarding using MSRP with SIP and SDP. For IM and file transfer, the media-line proposing MSRP is accompanied by a mandatory "path" attribute. This attribute includes one or more URIs visited between the user agent and the WSC media engine 114. The leftmost URI is the element closest to the WSC media engine 114. The rightmost URI is the endpoint that initially generated the SDP offer or answer. The rightmost URI supplies the session-id for this session. The media-line proposing MSRP is accompanied by an "accept-types" attribute which specifies media types acceptable to the endpoint which generated the SDP. Media types and subtypes may be wild-carded (specified via "*"). Accept-types may include Multipurpose Internet Mail Extensions ("MIME") formats that include internal types.

The media-line proposing MSRP may be accompanied by an "accept-wrapped-types" attribute, which specifies media-types that is wrapped inside a container type (the container type being included in the "accept-types" attribute). MSRP media-lines include a protocol field of either "TCP/MSRP" or "TCP/TLS/MSRP." MSRP media-lines include a port that matches the endpoint's MSRP URI in the path attribute. The exception is a media-line port value of zero indicating a user agent that has declined the MSRP media-line. The RFC allows multiple MSRP media-lines to use a single port.

MSRP connections are made using transport information from the MSRP URI in the path attribute. Transport information from m-lines and c-lines are not used to create MSRP connections. Media-lines proposing MSRP may be accompanied by connection-oriented media attributes specified in IETF RFC4145 (e.g., "setup" and "connection"), however MSRP connection setup is simplified to default, with the party sending the original being responsible for connecting to its peer, except where MSRP/WSS is on the MSRP session outleg. The media-line proposing MSRP may be accompanied by "max-size," "max-size-label," and "max-size-value" attributes and media format entries. Media flow direction attributes may be present, specifically "sendonly," "recvonly," "inactive," and "sendrecv." These attributes indicate permissible direction(s) for MSRP SEND requests.

In one embodiment, as an MSRP B2B relaying MSRP session content, WSC media engine 114 is minimally involved in processing MSRP specific SDP attributes. The MSRP mstream support code in media engine 114 for each MSRP media-line provides the following functionality in accordance with one embodiment.

If not anchoring media, leave the SDP undisturbed.

If anchoring media, remove any SDP MSRP media-lines and associated attributes as indicated by session config.

If anchoring media for all MSRP media-lines surviving the previous scenario, save the received list of MSRP URIs in the path attribute, and rewrite the path attribute to represent media engine 114 in the forwarded SDP.

If the path attribute was updated in the previous scenario, update associated m-line and c-line transport information.

If session-config indicates the SDP is being forwarded to a WebRTC endpoint, the rewritten path attribute will not include a proper MSRP URI, rather it will include information sufficient for the WebRTC endpoint to create a WebSocket connection to WSC media engine 114. The URI in the path attribute sent from the media engine should be compliant with the "WebSocket as a Transport for MSRP" IETF draft.

Figure 4:
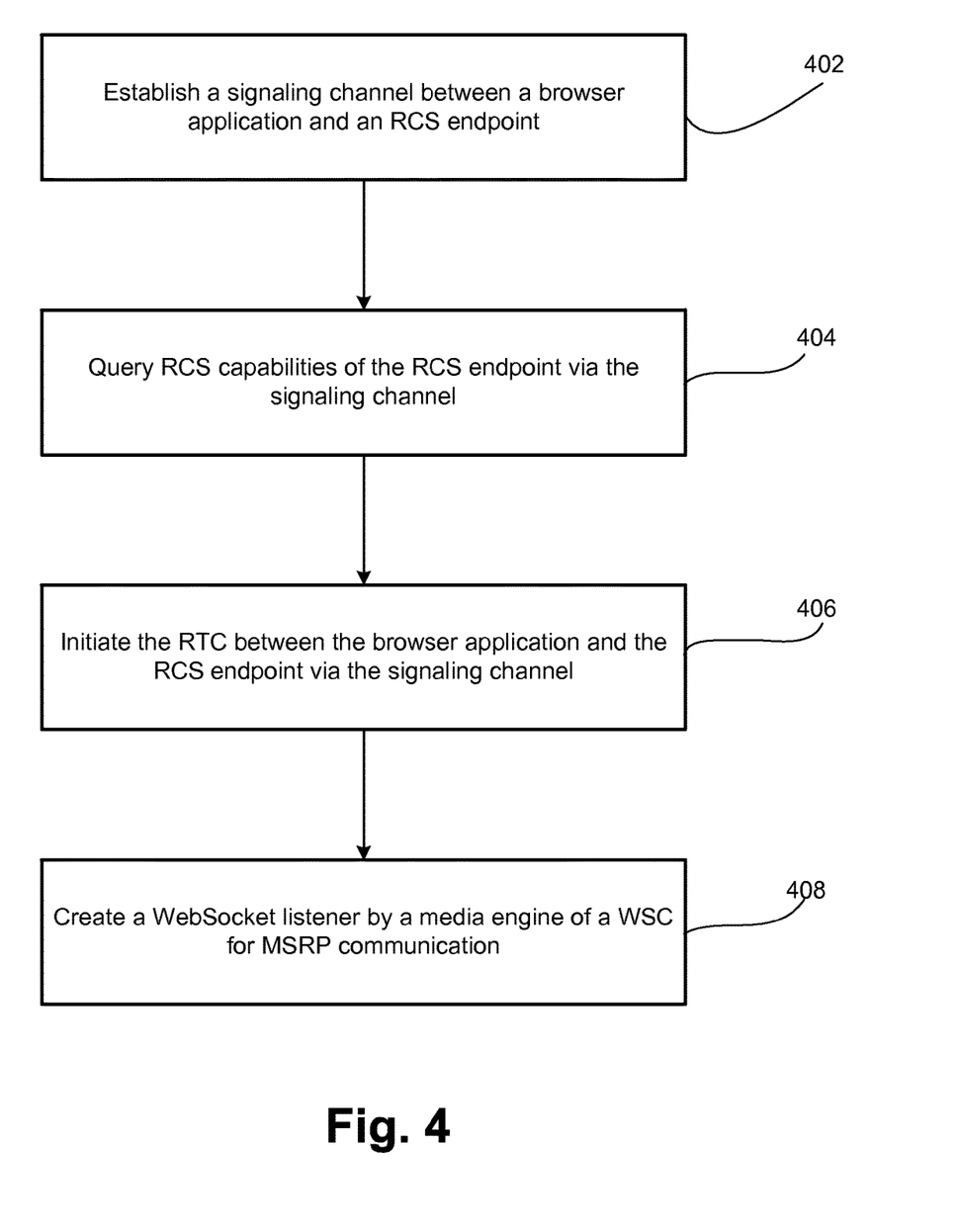
FIG. 4 is a flow diagram of the operation of the WebRTC session controller module of FIG. 2 when managing RTC in accordance with embodiments of the present invention.

FIG. 4 is a flow diagram of the operation of WebRTC session controller module 16 of FIG. 2 when managing an RTC in accordance with embodiments of the present invention. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 402, WebRTC session controller module 16 establishes a signaling channel between a browser application and an RCS endpoint. The browser application is a WebRTC application, and the signaling channel supports MSRP communications over WebSockets. In one embodiment, the WebRTC application establishes the signaling channel with a signaling engine within a WSC according to JsonRTC.

At 404, WebRTC session controller module 16 queries RCS capabilities of the RCS endpoint via the signaling channel. In one embodiment, the querying of the RCS capabilities of the RCS endpoint is performed via an API in an SDK of the browser application. In one embodiment, the querying of the RCS capabilities of the RCS endpoint is further implemented by Groovy scripts executed in a signaling engine within the WSC.

At 406, WebRTC session controller module 16 initiates the RTC between the browser application and the RCS endpoint via the signaling channel. The RTC is an RCS compliant RTC with the RCS endpoint via an API in a JavaScript SDK. The RCS compliant RTC may include standalone messaging, 1-1 chat, group chat, file transfer, image sharing, or video sharing.

At 408, WebRTC session controller module 16 creates a WebSocket listener by a media engine 114 of the WSC for the MSRP communications. The WebSocket listener is created based on a SDP communications received by the signaling engine over a SIP from the RCS endpoint. In one embodiment, the WebSocket listener has a complete URI comprising an ephemeral port and a unique context root.

As disclosed, embodiments implement a flexible WebRTC-RCS gateway. This gives the developers the possibility of implementing WebRTC and RCS applications quickly using the JavaScript SDK. Further, by using a Groovy script in the signaling engine, web applications can control the flexibility of the WSC gateway. Embodiments further provide an MSRP over WebSocket implementation that is transparent to client applications.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to perform real-time communications (RTC), the performing comprising:

establishing a signaling channel between a browser application and a rich communications services (RCS) endpoint, wherein the browser application is a WebRTC application and the signaling channel supports Message Session Relay Protocol (MSRP) communications over WebSockets, wherein the WebRTC application establishes the signaling channel with a signaling engine within a WebRTC Session Controller (WSC) according to a JavaScript Object Notation (JSON) protocol for RTC (JsonRTC);

querying RCS capabilities of the RCS endpoint via the signaling channel via an application programming interface (API) in a JavaScript software development kit (SDK) implemented at the browser application;

initiating the RTC between the browser application and the RCS endpoint via the signaling channel; and creating a WebSocket listener by a media engine of the WSC for the MSRP communications, wherein the WebSocket listener is created based on parameters received by the signaling engine over a Session Initiation Protocol (SIP) from the RCS endpoint.

2. The non-transitory computer-readable medium of claim 1, wherein the WSC is configured to translate the JsonRTC protocol to the SIP in conformance with RCS.

3. The non-transitory computer-readable medium of claim 1, wherein the parameters comprise Session Description Protocol (SDP) communications.

4. The non-transitory computer-readable medium of claim 1, wherein the WebSocket listener has a complete uniform resource identifier (URI) comprising an ephemeral port and a unique context root.

5. The non-transitory computer-readable medium of claim 1, wherein the RTC is an RCS compliant RTC with the RCS endpoint via the application programming interface (API) in the JavaScript software development kit (SDK).

6. The non-transitory computer-readable medium of claim 5, wherein the RCS compliant RTC comprises at least one of standalone messaging, 1-1 chat, group chat, file transfer, image sharing, or video sharing.

7. The non-transitory computer-readable medium of claim 1, wherein the querying of the RCS capabilities of the RCS endpoint is implemented by Groovy scripts executed in the signaling engine within the WebRTC Session Controller (WSC).

8. A method of real-time communications (RTC) comprising:

establishing a signaling channel between a browser application and a rich communications services (RCS) endpoint, wherein the browser application is a WebRTC application and the signaling channel supports Message Session Relay Protocol (MSRP) communications over WebSockets, wherein the WebRTC application establishes the signaling channel with a signaling engine within a WebRTC Session Controller (WSC) according to a JavaScript Object Notation (JSON) protocol for RTC (JsonRTC);

querying RCS capabilities of the RCS endpoint via the signaling channel via an application programming interface (API) in a JavaScript software development kit (SDK) implemented at the browser application;

initiating the RTC between the browser application and the RCS endpoint via the signaling channel; and creating a WebSocket listener by a media engine of the WSC for the MSRP communications, wherein the WebSocket listener is created based on parameters received by the signaling engine over a Session Initiation Protocol (SIP) from the RCS endpoint.

9. The method claim 8, wherein the WSC is configured to translate the JsonRTC protocol to the SIP in conformance with RCS.

10. The method of claim 8, wherein the parameters comprise Session Description Protocol (SDP) communications.

11. The method of claim 8, wherein the WebSocket listener has a complete uniform resource identifier (URI) comprising an ephemeral port and a unique context root.

12. The method claim 8, wherein the RTC is an RCS compliant RTC with the RCS endpoint via the API in the JavaScript SDK.

13. The method claim 12, wherein the RCS compliant RTC comprises at least one of standalone messaging, 1-1 chat, group chat, file transfer, image sharing, or video sharing.

14. The method claim 8, wherein the querying of the RCS capabilities of the RCS endpoint is implemented by Groovy scripts executed in the signaling engine within the WSC.

15. A real-time communications (RTC) system comprising:

a processor executing instructions stored in memory to implement a plurality of modules comprising:

an establishing module that establishes a signaling channel between a browser application and a rich communications services (RCS) endpoint, wherein the browser application is a WebRTC application and the signaling channel supports Message Session Relay Protocol (MSRP) communications over WebSockets, wherein the WebRTC application establishes the signaling channel with a signaling engine within a WebRTC Session Controller (WSC) according to a JavaScript Object Notation (JSON) protocol for RTC (JsonRTC);

a querying module that queries RCS capabilities of the RCS endpoint via the signaling channel via an application programming interface (API) in a JavaScript software development kit (SDK) implemented at the browser application;

an initiating module that initiates the RTC between the browser application and the RCS endpoint via the signaling channel; and a creating module that creates a WebSocket listener by a media engine of the WSC for the MSRP communications, wherein the WebSocket listener is created based on parameters received by the signaling engine over a Session Initiation Protocol (SIP) from the RCS endpoint.

16. The system of claim 15, wherein the WSC is configured to translate the JsonRTC protocol to the SIP in conformance with RCS.

17. The system of claim 15, wherein the parameters comprise Session Description Protocol (SDP) communications.

18. The system of claim 15, wherein the RTC is an RCS compliant RTC with the RCS endpoint via the API in the JavaScript SDK.

19. The system of claim 18, wherein the RCS compliant RTC comprises at least one of standalone messaging, 1-1 chat, group chat, file transfer, image sharing, or video sharing.

20. The system of claim 15, wherein the querying of the RCS capabilities of the RCS endpoint is implemented by Groovy scripts executed in the signaling engine within the WSC.

\* \* \* \* \*

UNITED STATES PATENT AND TRADEMARK OFFICE
CERTIFICATE OF CORRECTION

PATENT NO. : 9,648,052 B2
APPLICATION NO. : 14/604086
DATED : May 9, 2017
INVENTOR(S) : Gangadharan et al.

Page 1 of 1

It is certified that error appears in the above-identified patent and that said Letters Patent is hereby corrected as shown below:

In the Claims

In Column 20, Line 15, in Claim 9, delete "method claim" and insert -- method of claim --, therefor.

In Column 20, Line 24, in Claim 12, delete "method claim" and insert -- method of claim --, therefor.

In Column 20, Line 27, in Claim 13, delete "method claim" and insert -- method of claim --, therefor.

In Column 20, Line 31, in Claim 14, delete "method claim" and insert -- method of claim --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*